United States Patent [19]

Torobin

[11] 4,363,646
[45] Dec. 14, 1982

[54] METHOD AND APPARATUS FOR PRODUCING MICROFILAMENTS

[76] Inventor: Leonard B. Torobin, c/o Materials Technology Corp., 2198 Princeton St., Sarasota, Fla. 33578

[21] Appl. No.: 325,594

[22] Filed: Nov. 27, 1981

Related U.S. Application Data

[63] Continuation-in-part of Ser. No. 152,693, May 23, 1980, Pat. No. 4,303,431, which is a continuation of Ser. No. 59,297, Jul. 20, 1979, abandoned, which is a continuation-in-part of Ser. No. 937,123, Aug. 28, 1978, abandoned, which is a continuation-in-part of Ser. No. 944,643, Sep. 21, 1978, abandoned.

[51] Int. Cl.³ .............................................. C03B 37/04
[52] U.S. Cl. .......................................... 65/5; 65/16; 264/12; 425/7
[58] Field of Search ................ 65/5, 16, 21.4; 264/12; 425/7

[56] References Cited

U.S. PATENT DOCUMENTS

| | | | |
|---|---|---|---|
| 2,982,991 | 5/1961 | Karlovitz | 65/16 X |
| 3,357,808 | 12/1967 | Eberle | 65/7 |
| 3,885,940 | 5/1975 | Levecque | 65/5 |
| 4,303,432 | 12/1981 | Torobin | 65/21.4 |
| 4,303,433 | 12/1981 | Torobin | 65/21.4 |

FOREIGN PATENT DOCUMENTS 49-5722  2/1974  Japan ........................................ 65/22

Primary Examiner—Robert L. Lindsay, Jr.

Attorney, Agent, or Firm—Perry Carvellas

[57] ABSTRACT

Relatively long microfilaments made from a low heat conductivity glass composition are described. The microfilaments are used to make insulation and/or filler materials.

The microfilaments are made by forming a liquid film of molten glass across a coaxial blowing nozzle 5, applying a blowing gas 10 at a positive pressure on the inner surface of the glass film to blow the film and form an elongated hollow tube or cylinder 12 of molten glass.

Means are provided for forming a thinned wall or weakened portion of the forming elongated tube or cylinder. A transverse jet 13 is used to direct an entraining fluid 14 over and around the blowing nozzle 5 at an angle to the axis of the blowing nozzle. The entraining fluid 14 as it passes over and around the blowing nozzle 5 fluid dynamically induces a pulsating or fluctuating pressure field at the opposite or lee side of the blowing nozzle in the wake or shadow of the coaxial blowing nozzle and produces a laminar flow of entraining fluid in the vicinity of the forming elongated tube or cylinder. The continued movement of the entraining fluid 14 over the elongated cylinder 12 produces asymmetric fluid drag forces on the cylinder, and at the thinned walled or weakened portion longitudinally breaks the cylinder to form a multiplicity of microfilaments, and detaches the microfilaments from the elongated cylinder and from the coaxial blowing nozzle and the detached filaments are carried away from the blowing nozzle.

18 Claims, 6 Drawing Figures

METHOD AND APPARATUS FOR PRODUCING MICROFILAMENTS

SUMMARY OF THE INVENTION

The present application is a continuation-in-part of applicant's copending application Ser. No. 152,693, filed May 23, 1980, now U.S. Pat. No. 4,303,431, granted Dec. 1, 1981 which is a continuation of Ser. No. 059,297 filed July 20, 1979, which is a continuation-in-part of applications Ser. Nos. 937,123 and 944,643 filed Aug. 28, 1978 and Sept. 21, 1978, respectively. The applications Ser. Nos. 059,297, 937,123 and 944,643 are now abandoned.

The present invention relates to a method and apparatus for making microfilaments from inorganic film forming materials or compositions and particularly for making glass microfilaments.

The present invention particularly relates to glass microfilaments used to make an improved insulation material.

The present invention also relates to glass microfilaments spun into fibers for the manufacture of woven fabrics.

The present invention relates to glass microfilaments suitable for use as reinforcing filler material in plastics, concrete and asphalt compositions.

The present invention particularly relates to a method and apparatus for using a coaxial blowing nozzle to blow glass microfilaments from molten glass compositions comprising forming an elongated hollow tube or cylinder and subjecting the tube or cylinder during its formation to an external pulsating or fluctuating pressure field having periodic oscillations. The pulsating of fluctuating pressure field produces a laminar flow of entraining fluid in the vicinity of the forming elongated tube or cylinder.

Means are provided for forming a thinned wall or weakened portion of the forming elongated hollow tube or cylinder. The thinned wall or weakened portion of the elongated tube or cylinder causes a longitudinal break along the length of the elongated cylinder. The pulsating or fluctuating pressure field causes the broken elongated cylinder to flap and to form a multiplicity of small diameter filaments. The continued feeding of molten glass to the coaxial nozzle stabilizes the longitudinal break in the elongated cylinder a short distance below the coaxial nozzle. The filaments are entrained in the entraining fluid, increase in length, are stretched and pulled and break away from the portion of the elongated cylinder attached to the coaxial nozzle.

A transverse jet is used to induce the external pulsating or fluctuating pressure field by directing the entraining fluid over and around the blowing nozzle at an angle to the axis of the blowing nozzle. The entraining fluid as it passes over and around the blowing nozzle envelops and acts on the molten glass as it is being blown to form the elongated hollow tube or cylinder and the microfilaments and to detach the microfilaments from the coaxial blowing nozzle.

Quench means may be disposed close to and below the blowing nozzles to direct a quench fluid onto the microfilaments to rapidly cool and solidify the microfilaments.

BACKGROUND OF THE INVENTION

In recent years, the substantial increases in the energy costs of heating and cooling has encouraged the development of new and better insulation materials and many new insulation materials have been developed in an attempt to satisfy this need.

One of the recently developed materials has been fiberglass insulation. The known methods for producing fiberglass insulation has required, because of the relatively short glass fibers produced, the use of organic resin adhesives.

The use of organic resin adhesives to make fiberglass insulation has limited the use of the fiberglass insulation to temperatures of 200° to 400° F. at which the adhesives decompose.

The conventional methods of making glass fibers for use in making fiberglass insulation also suffer the disadvantages of requiring the use of relatively large amounts of energy to manufacture a given amount of fibers and/or requiring large capital investments in fiber blowing apparatus.

The known methods for producing glass fibers for insulation have not been successful in producing microfilaments of relatively long length at an economical cost.

One of the known methods of producing glass fibers is described in Mukai et al. U.S. Pat. No. 4,166,656. The Mukai et al. patent describes a method of using a coaxial nozzle to discharge a hollow molten stream of glass while continuously blowing a gas at the hollow stream of glass to press, extend, smash and blow away the molten stream of glass. As a result, the molten glass stream is finely broken up into relatively short fibers. The Mukai et al. patent does not produce the relatively long glass fibers produced in accordance with the present invention.

In addition the recent substantial increases in costs of basic materials such as plastics, cement, asphalt and the like has also encouraged development and use of reinforcing filler materials to reduce the amount and cost of the basic materials used and the weight of the finished materials. One of the suggested filler materials utilizes glass fibers. The present invention which produces relatively long glass filaments at an economical low price provides an improved glass filament material for use as a filler and reinforcing material.

Further, the use of conventional fiberglass materials for insulation is being questioned in the light of the recently discovered possibility that fiberglass of certain particle size may be carcinogenic in the same or similar manner as asbestos.

In addition, in some applications, the use of conventionally produced fibers for fiberglass production and/or fillers presents a potentially serious problem because they are difficult to handle since they are readily elutriated and tend to blow about. In situations of this type, the relatively long microfilaments of the present invention provide a convenient and safe method of handling the microfilaments.

Thus, the known methods for producing glass fibers for fiberglass insulation and/or fillers have not been successful in producing relatively long glass fibers or in producing long glass fibers at relatively low economical costs and energy requirements.

OBJECTS OF THE INVENTION

It is an object of the present invention to provide a process and an apparatus for making relatively long glass microfilments.

It is another object of the present invention to utilize the glass microfilaments of the present invention in the manufacture of improved insulating materials.

It is another object of the present invention to make glass microfilaments for use as an/or in reinforcing filler materials.

It is another object of the present invention to produce glass microfilaments having relatively long lengths and relatively uniform diameter size distribution.

It is another object of the invention to produce glass microfilaments from low heat conductivity glass compositions.

It is another object of the present invention to produce spun microfilament fibers for use in producing woven glass fabrics.

BRIEF DESCRIPTION OF THE INVENTION

The present invention relates to glass microfilaments and to a process and apparatus for making the microfilaments. The present invention more particularly relates to the use of glass microfilaments in the manufacture of improved insulation materials and improved filler materials and reinforcing filler materials.

The microfilaments are preferably made from a glass composition or a low heat conductivity glass composition.

The glass microfilaments of the present invention are made by forming a liquid film of molten glass across a coaxial blowing nozzle, applying a blowing gas or an inert blowing gas at a positive pressure on the inner surface of the glass film to blow the film and form elongated hollow tube or cylinder shaped liquid film of molten glass. The elongated tube or cylinder is initially closed at its outer end and is attached at its inner to the coaxial blowing nozzle. Means are provided in the coaxial blowing nozzle for forming a thinned wall or weakened portion of the forming elongated tube or cylinder. A transverse jet is used to direct an entraining fluid over and around the blowing nozzle. The entraining fluid as it passes over and around the blowing nozzle fluid dynamically induces a pulsating or fluctuaring pressure field at the opposite or lee side of the blowing nozzle in the wake or shadow of the coaxial blowing nozzle and produces a laminar flow of entraining fluid in the area of the forming elongated tube or cylinder. The fluctuating pressure field has regular periodic lateral oscillations similar to those of a flag flapping in a breeze. The continued movement of the entraining fluid over the elongated cylinder produces asymmetric fluid drag forces on the cylinder, and at the thinned walled or weakened portion longitudinally breaks the cylinder to form a multiplicity of microfilaments, and detaches the microfilaments from the elongated cylinder and from the coaxial blowing nozzle and the detached filaments are carried away from the blowing nozzle.

The thin walled or weakened section of the elongated cylinder causes the cylinder to break. The induced fluctuating pressure field causes the elongated cylinder to flap and to quickly enlarge the break and to form a multiplicity of small diameter filaments. The break proceeds up the elongated cylinder towards the coaxial nozzle. The contained feeding of molten glass to the coaxial nozzle stabilizes the break a short distance below the coaxial nozzle. The filaments are entrained in the transverse jet entraining fluid, are stretched, increase in length and pulled and break away from the portion of the elongated cylinder attached to the coaxial blowing nozzle.

The means for providing the thinned wall or weakened portion of the forming elongated hollow tube or cylinder may be contained within the coaxial blowing nozzle in the annular space between the outer coaxial nozzle and the inner coaxial nozzle. The means provided may take the form of one or more thickened or enlarged portions of the inner nozzle disposed lengthwise on the outer surface of the inner nozzle. The length, diameter and height of the thickened or enlarged portions are such that they cause the flow of molten glass as it passes over and around the thickened or enlarged portions to become thinned and weakened. The thinned and weakened portion of the molten glass is carried downwardly and outwardly into the forming elongated hollow cylinder or tube. It is this thinned or weakened portion of the forming elongated hollow cylinder or tube that causes the cylinder or tube to break along its length and form the microfilaments. The thickened portion of the inner nozzle is disposed at or near the outer edge of the inner nozzle.

The molten glass temperature and feed rate, the transverse jet entraining fluid linear velocity, the blowing gas pressure and the quench rate at a given coaxial nozzle gap will to some extent determine the microfilament length and diameter and size distribution.

A balancing but slightly lower gas pressure than the blowing gas pressure is provided in the area in which the elongated cylinder is formed.

Quench nozzles may be disposed below and on either side of the blowing nozzle to direct cooling fluid at and into contact with the molten glass microfilaments to rapidly cool and solidify the molten glass and form a hard, smooth microfilament of relatively long length.

THE ADVANTAGES

The present invention overcomes many of the problems associated with prior attempts to produce glass microfilaments and to use the microfilaments in the manufacture of insulating materials. The process and apparatus of the present invention allows the production of glass microfilaments of relatively long length and relatively uniform diameter such that superior insulation materials and improved filler materials can be designed, manufactured and tailor made to suit a particular desired use.

The relatively long glass microfilaments produced in accordance with the present invention have the distinct advantage that due to their long length they do not tend to scatter during manufacture and subsequent handling.

The process and apparatus of the present invention provide a practical and economical means by which relatively long microfilaments can be manufactured for use as insulation, filler and reinforcing materials.

The present invention because of the ability to manufacture relatively long length microfilaments allows for the production of fiber glass insulation materials without the need for an organic adhesive binder. The ability to manufacture fiberglass insulation without the use of an organic adhesive binder permits the use of the fiberglass insulation at temperatures of 1600° to 2600° F., i.e. the melting temperature of the glass filaments instead of the melting temperature of the organic adhesive binder.

The microfilaments of the present invention because of their relatively long length can be spun into fibers and woven into fabrics, e.g. to be used in the manufacture of fire resistant fabrics.

BRIEF DESCRIPTION OF THE DRAWINGS

The attached drawings illustrate exemplary forms of the method and apparatus of the present invention for making microfilaments for use in and as insulating materials and/or for use in and as filler materials.

The FIG. 1 of the drawings shows in cross-section an apparatus having multiple coaxial blowing nozzle means for supplying the gaseous material for blowing glass microfilaments, a transverse jet for providing an entraining fluid to assist in the formation and detachment of the microfilaments from the blowing nozzles, and means for supplying a quench fluid to cool the microfilaments.

Figure 3:
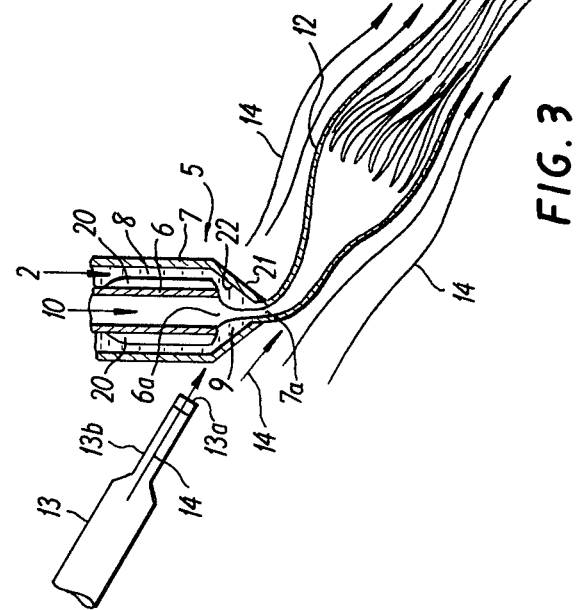

The FIG. 3 of the drawings is an enlarged detailed cross-section of a modified form of a blowing nozzle in which the lower end of the nozzle is tapered inwardly.

Figure 2:
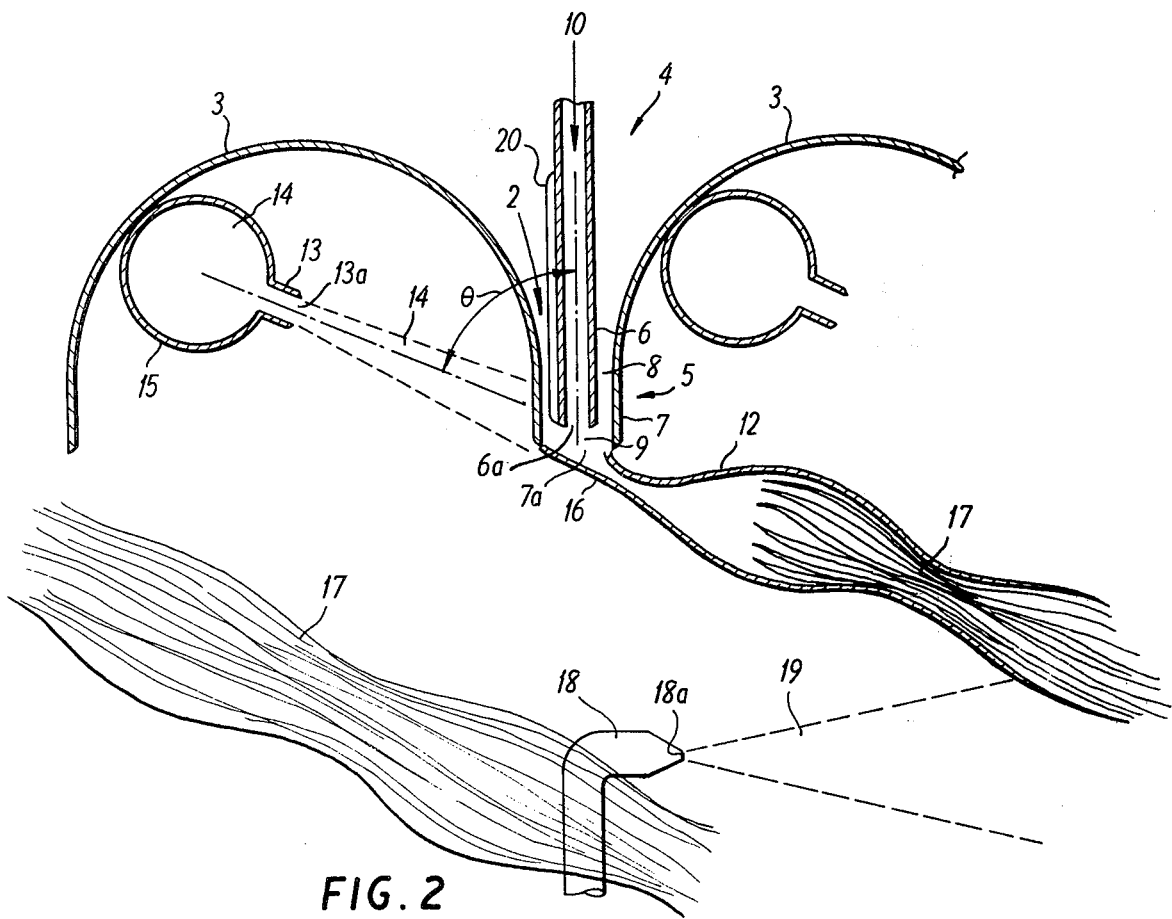
FIG. 2 of the drawings is an enlarged detailed cross-section of the nozzle means of apparatus shown in FIG. 1.
Figure 4C:
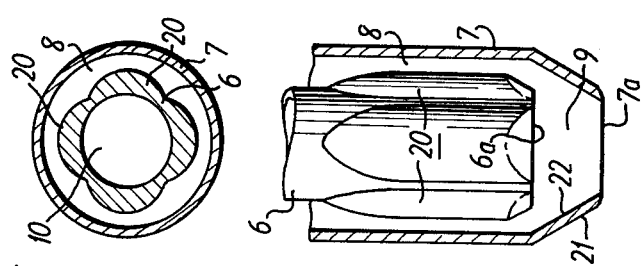
Figure 4B:
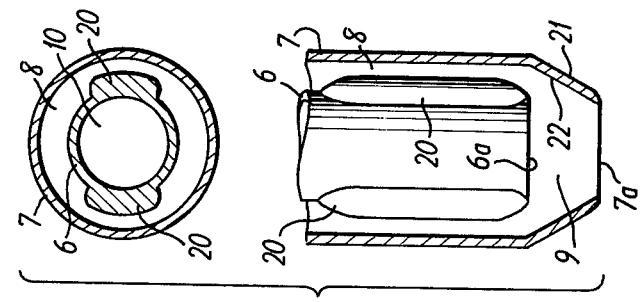
Figure 4A:
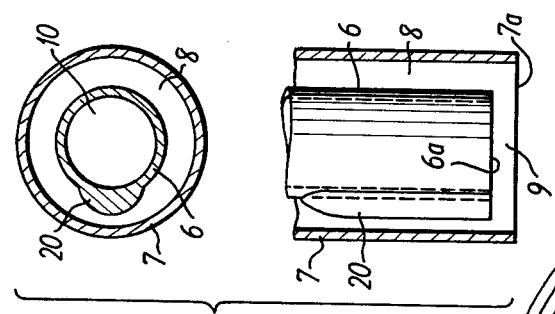

The FIG. 4A of the drawings is a detailed cross-section and a top plane view of a coaxial blowing nozzle tip of the type shown in FIG. 2.

The FIG. 4B of the drawings is a detailed cross-section and top plane view of a coaxial blowing nozzle tip of the type illustrated in FIG. 3 of the drawings.

The FIG. 4C of the drawings is a detailed cross-section and top plane view of a modified form of a coaxial blowing nozzle.

DETAILED DISCUSSION OF THE DRAWINGS

The invention will be described with reference to the accompanying figures of the drawings wherein like numbers designate like parts throughout the several views.

Figure 1:
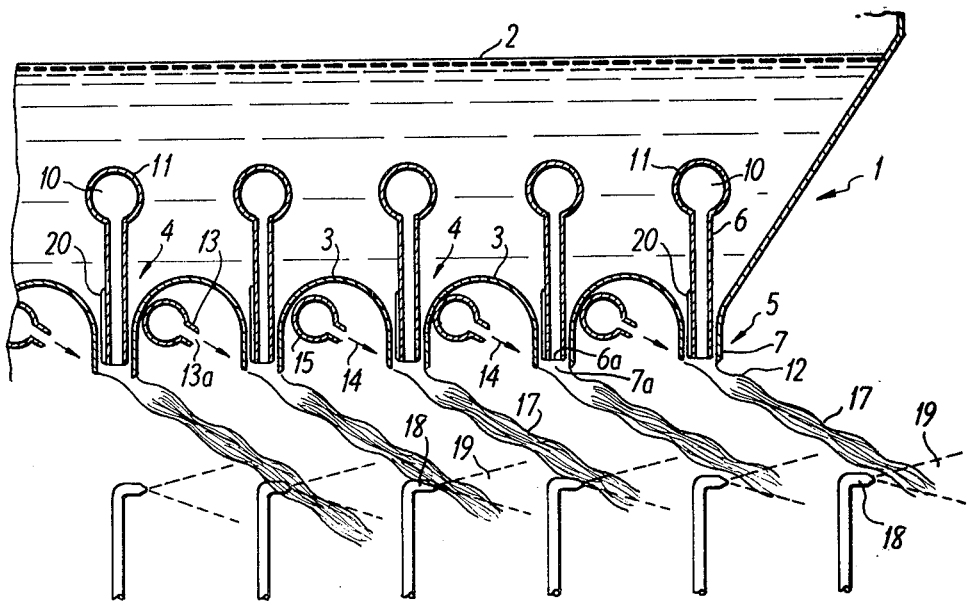

Referring to FIGS. 1 and 2 of the drawings, there is illustrated a vessel 1, made of suitable refractory material and heated by means not shown for holding molten glass 2. The bottom floor 3 of vessel 1 contains a plurality of openings 4 through which molten glass 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for a blowing gas or an inert blowing gas and an outer nozzle 7 having an orifice 7a for molten glass. The inner nozzle 6 is disposed within and coaxial to outer nozzle 7 to form annular space 8 between nozzles 6 and 7, which annular space provides a flow path for molten glass 2. The orifice 6a of inner nozzle 6 terminates at or a short distance above the plane of orifice 7a of outer nozzle 7.

There is disposed in annular space 8 on the outer surface of inner nozzle 6 a thickened or enlarged portion 20 means for providing the thinned wall or weakened portion of the elongated hollow tube or cylinder. The length, diameter and height of the thickened or enlarged portion 20 are such that they cause the flow of molten glass as it passes over and around the thickened or enlarged portion 20 to become thinned and weakened.

The molten glass 2 at about atmospheric pressure or at elevated pressure flows downwardly through annular space 8 and fills the area 9 between orifice 6a and 7a. The surface tension forces in molten glass 2 form a thin liquid molten glass film 9 across orifice 6a and 7a.

A blowing gas 10 which is heated by means not shown to about the temperature of the molten glass and which is at a pressure above the molten glass pressure at the blowing nozzle, is fed through distribution conduit 11 and inner coaxial nozzle 6 and brought into contact with the inner surface of molten glass film 9. The blowing gas exerts a positive pressure on the molten glass film to blow and distend the film outwardly to form an elongated cylinder shaped liquid film 12 of molten glass filled with the blowing gas 10. The elongated cylinder 12 is initially closed at its outer end and is connected at its inner end to outer nozzle 7 at the peripheral edge of orifice 7a. The thinned and weakened portion of the molten glass is carried downwardly and outwardly to form the elongated hollow tube or cylinder 12.

The elongated hollow tube or cylinder is subjected during its formation to an external pulsating or fluctuating pressure field having periodic oscillations. The pulsating or fluctuating pressure field produces a laminar flow of entraining fluid in the vicinity of the forming elongated tube or cylinder.

The thinned wall or weakened portion of the elongated cylinder or tube 12 causes a longitudinal break along the length of the elongated cylinder 12. The pulsating or fluctuating pressure field causes the broken elongated cylinder 12 to flap and to form a multiplicity of small diameter filaments 17. The continued feeding of molten glass 2 to the coaxial nozzle 5 stabilizes the longitudinal break in the elongated cylinder a short distance below the coaxial nozzle 5. The microfilaments, however, remain connected to each other at the end of the elongated cylinder connected to the coaxial blowing nozzle. The filaments 17 are entrained in the entraining fluid 14, increase in length, are stretched and pulled and break away from the portion of the elongated cylinder attached to the coaxial nozzle.

A balancing pressure of a gas or of an inert gas, i.e. a slightly lower pressure, is provided in the area of the blowing nozzle into which the elongated cylinder shaped liquid film is blown. The illustrated coaxial nozzle can be used to produce glass microfilaments having relatively long lengths and relatively thick uniform diameters and is useful in blowing microfilaments from low viscosity glass material.

A transverse jet 13 is used to induce the external pulsating or fluctuating pressure field by directing an entraining fluid 14 over and around the blowing nozzle 5 at an angle to the axis of the blowing nozzle. The entraining fluid 14 is heated to about, below or above the temperature of the molten glass 2, by means not shown. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microfilament forming region at and behind the orifice 7a. The entraining fluid as it passes over and around the blowing nozzle 5 envelopes and acts on the molten glass as it is being blown to form the elongated hollow tube or cylinder 12 and the microfilaments 17 and to detach the microfilaments from the coaxial blowing nozzle. The surface tension forces of the the molten glass act on the entrained, falling microfilaments 12 and cause the microfilaments to seek a minimum surface area and to form a circular shaped cross section area.

Quench nozzles 18 having orifices 18a may be disposed below and on both sides of coaxial blowing nozzle 5 to direct cooling fluid 19 at and into contact with the molten glass microfilaments 17 to rapidly cool and solidify the molten glass and form hard, smooth glass microfilaments. The quench fluid 19 may also serve to carry the glass microfilaments away from the coaxial blowing nozzle 5.

The FIG. 3 of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a. The figure of the drawings also shows elongated cylinder shaped liquid film 12 with a pinched portion 16 and a multiplicity of microfilaments 17. There is shown disposed in annular space 8 on two opposite sides of the lower outer surface of inner nozzle 6 two thickened or enlarged portions 20 means for providing the thinned wall or weakened portion of the elongated hollow tube or cylinder 12. The length, diameter and height of the thickened or enlarged portions 20 are such that they cause the flow of molten glass as it passes over and around the enlarged or thickened portions 20 to become thinned and weakened.

The use of the tapered nozzle 21 construction was found to substantially assist in the formation of a thin molten glass film 9 in the area between orifice 6a of inner nozzle 6 and orifice 7a of outer nozzle 7. The inner wall surface 22 of the taper portion 21 of the outer nozzle 7 when pressure is applied to molten glass 2 forces the molten glass 2 to squeeze through a fine gap formed between the outer edge of orifice 6a and the inner surface 22 to form the thin molten glass film 9 across orifice 6a and 7a. Thus, the formation of the molten film 9 does not in this embodiment rely solely on the surface tension properties of the molten glass. The illustrated coaxial nozzle can be used to produce microfilaments having relatively long lengths and allows making microfilaments of smaller diameter than those made using the FIG. 2 apparatus and is particularly useful in blowing high viscosity glass materials.

The diameter of the microfilaments is determined in part by the thickness of the wall of the elongated hollow cylinder which is determined by the gap formed by the tapered nozzle 21 and the outer edge of the inner nozzle 6a. This apparatus allows the use of larger inner diameters of outer nozzle 7 and larger inner diameters of inner nozzle 6, both of which reduce the possibility of plugging of the coaxial nozzles when in use.

The FIG. 3 of the drawings also shows an embodiment of the invention in which the outer portion of the transverse jet 13 is flattened to form a generally rectangular or oval shaped orifice opening 13a. The orifice opening 13a can be disposed at an angle relative to a line drawn through the central axis of coaxial nozzle 5. The preferred angle, however, is that illustrated in the drawing. That is, at an angle of about 90° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the enlongated hollow cylinder at the opposite or lee side of the blowing nozzle 5.

The FIGS. 4A, 4B and 4C of the drawings show detailed cross sections and top plane views of three embodiments of the coaxial blowing nozzle tips of the present invention.

In the FIG. 4A there is shown disposed in annular space 8 on the lower outer surface of inner nozzle 6 a single thickened or enlarged portion 20 for providing the thinned wall or weakened portion of the elongated hollow tube or cylinder 12.

In the FIG. 4B there is shown disposed in annular space 8 on opposite sides of the lower outer surface of inner nozzle 6 two thickened or enlarged portions 20 for providing the thinned wall or weakened portions of the elongated hollow tube or cylinder 12.

In the FIG. 4C there is shown disposed in annular space 8 equally spaced on the outer surface of inner nozzle 6 four thickened or enlarged portions 20 for providing the thinned wall or weakened portions of the elongated hollow tube or cylinder 12.

INORGANIC FILM FORMING MATERIAL AND GLASS COMPOSITIONS

The inorganic film forming material and compositions and particularly the glass compositions from which the glass microfilaments of the present invention are made can be widely varied to obtain the desired physical characteristics for heating, blowing, forming, cooling and hardening the microfilaments and the desired heat insulating, and strength characteristics of the microfilaments produced.

Glass compositions that are suitable for use in the present invention are described in applicant's copending application, Ser. No. 152,693, filed May 23, 1980, which is incorporated by reference herein in its entirety.

To assist in the blowing and formation of the glass microfilaments and to control the surface tension and viscosity of the elongated cylinder being formed suitable surface active agents, such as colloidal particles of insoluble substances and viscosity stabilizers can be added to the glass compositions as additives.

The microfilaments and particularly the glass microfilaments can be blown with a gas, e.g. an inert gas. Suitable blowing gases are argon, nitrogen and air.

Blowing gases can also be selected that react with the inorganic film forming material or composition, e.g. the glass microfilaments, for example, to assist in the hardening of the microfilaments.

The transverse jet entraining fluid can be a gas at a high or low temperature and can be selected to react with or be inert to the glass composition. The entraining fluid, e.g. an inert entraining fluid, can be a relatively high temperature gas. Suitable entraining fluids are nitrogen, air, steam and argon.

The quench fluid can be a liquid, a liquid dispersion or a gas. Suitable quench fluids are steam, a fine water spray, air, nitrogen or ethylene glycol spray.

PROCESS CONDITIONS

The inorganic film forming materials and/or compositions of the present invention are heated to a temperature of about 1800° to 3100° F. and maintained in a liquid, fluid form at the desired blowing temperature during the blowing operation. The glass composition is heated to a temperature of 1600° to 2800° F., preferably 2300° to 2750° F., and more preferably 2400° to 2700° F., depending on the constituents of the composition.

The glass compositions at the operating temperatures, i.e. the blowing temperatures, are molten, fluid and flow easily. The molten glass just prior to the blowing operation has a viscosity of 10 to 400 poises, preferably 20 to 250, and more preferably 30 to 150 poises.

The molten glass is continuously fed to the coaxial blowing nozzle during the blowing operation to prevent premature breaking and detaching of the microfilaments as they are being formed.

The blowing gas or inert blowing gas will be at about the same temperature as the molten glass being blown. The blowing gas temperature can, however, be at a higher temperature than the molten glass to assist in maintaining the fluidity of the hollow molten elongated glass cylinder during the blowing operation or can be at a lower temperature than the molten glass to assist in the solidification and hardening of the glass microfilaments as they are formed. The pressure of the blowing gas is sufficient to blow the hollow elongated glass cylinder and will be slightly above the pressure of molten glass at the orifice 7a of the outer nozzle 7. The blowing gas pressure will also depend on and be slightly above the ambient pressure external to the blowing nozzle.

The temperatures of the blowing gases will depend on the blowing gas used and the viscosity-temperature-shear relationship for the glass materials used to make the microfilaments.

The transverse jet inert entraining fluid which is directed over and around the coaxial blowing nozzle to assist in the formation of the hollow elongated cylinder and detaching of the glass microfilaments from the coaxial blowing nozzle can be at about the temperature of the molten glass being blown. The entraining fluid can, however, be at a higher temperature than the molten glass to assist in maintaining the fluidity of the hollow elongated cylinder and the microfilaments during the blowing operation or can be at a lower temperature than the molten glass to assist in the forming microfilaments as they are formed.

The transverse jet entraining fluid which is directed over and around the coaxial blowing nozzle to assist in the formation of the hollow elongated cylinder and detaching of the glass microfilaments from the coaxial blowing nozzle can have a linear velocity in the region of microfilament formation of 5 to 120 ft/sec, usually 10 to 80 ft/sec and more usually 20 to 60 ft/sec.

The length of the microfilaments and the diameter of the microfilaments depends to some extent on the viscosity of the glass and the linear velocity of the transverse jet entraining fluid.

The quench fluid can be at a temperature such that it cools the molten glass microfilaments to solidify, harden and strengthen the molten glass. The quench fluid can be at a temperature of 0° to 200° F., preferably 40° to 200° F. and more preferably 50° to 100° F. depending to some extent of the glass composition.

The time elapsed from commencement of the blowing of the hollow elongated glass cylinder to the cooling and hardening of the microfilaments can be 0.0001 to 1.0 second, preferably 0.0010 to 0.50 second and more preferably 0.010 to 0.10 second.

APPARATUS

Referring to FIGS. 1 and 2 of the drawings, the refractory vessel is constructed to maintain the molten glass at the desired operating temperatures. The molten glass 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.020 inch and an outer nozzle 7 having an inside diameter of 0.420 to 0.020 inch, preferably 0.260 to 0.025 and more preferably 0.130 to 0.030 inch. The inner nozzle 6 and outer nozzle 7 form annular space 8 which provides a flow path through which the molten glass 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifice 7a at a distance of 0.001 to 0.125 inch, preferably 0.002 to 0.050 inch and more preferably 0.003 to 0.025 inch. The molten glass 2 flows downwardly and is extruded through annular space 8 and fills the area between orifice 6a and 7a. The surface tension forces in the molten glass 2 form a thin liquid molten glass film 9 across orifice 6a and 7a which has about the same or a smaller thickness as the distance of orifice 6a is spaced above orifice 7a. The orifices 6a and 7a can be made from stainless steel, platinum, platinum alloys, ceramics or fused alumina. The surface tension forces in the liquid glass 2 form a thin liquid glass film 9 across orifices 6a and 7a which has about the same or a smaller thickness at the distance of orifice 6a is spaced above orifice 7a. The molten glass film 9 can be 25 to 3175 microns, preferably 50 to 1270 microns and more preferably 76 to 635 microns thick.

The FIG. 2 blowing nozzle can be used to blow molten glass at relatively low viscosities, for example, of 10 to 60 posies, and to blow glass microfilaments of relatively thick diameter, for example, of 20 to 100 microns or more.

The transverse jet 13 is used to direct an entraining fluid 14 through nozzle 13 and transverse jet nozzle orifice 13a at the coaxial blowing nozzle 5. The coaxial blowing nozzle 5 has an outer diameter of 0.52 to 0.030 inch, preferably 0.36 to 0.035 inch and more preferably 0.140 to 0.040 inch.

The transverse jet 13 is aligned to direct the flow of entraining fluid 14 over and around outer nozzle 7 in the microsphere forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersect of a line drawn along the center axis of transverse jet 13 and a line drawn along the center axis of coaxial blowing nozzle 5. The center axis of transverse jet 13 is aligned at an angle of 15° to 85°, preferably 25° to 75° and more preferably 35° to 35° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 at a point above the orifice 7a of outer nozzle 7 which is 0.5 to 4 times, preferably 1.0 to 3.5 times and more preferably 2 to 3 times the outside diameter of the coaxial blowing nozzle 5.

The entraining fluid assists in the formation and detaching of the glass microfilaments from the coaxial blowing nozzle. The use of the transverse jet and entraining fluid in the manner described also discourages wetting of the outer wall surface of the coaxial blowing nozzle 5 by the molten glass being blown.

The quench nozzles 18 are disposed below and on both sides of coaxial blowing nozzle 5 a sufficient distance apart to allow the microfilaments 17 to fall between the quench nozzles 18. The quench nozzles 18 direct cooling fluid 19 at and into contact with the molten glass microfilaments 17 to cool and solidify the molten glass and form hard, smooth, glass microfilaments.

The FIG. 3 of the drawings illustrates a preferred embodiment of the invention. It was found that in blowing molten glass compositions at high viscosities that it was advantageous to immediately prior to blowing the molten glass to provide by extrusion a very thin molten glass liquid film for blowing into the elongated cylinder shape liquid film 12. The thin molten glass liquid film 9 is provided by having the lower portion of the outer coaxial nozzle 7 tapered downwardly and inwardly at 21. The tapered portion 21 and inner wall surface 22 thereof can be at an angle of 15° to 75°, preferably 30° to 60° and more preferably about 45° relative to the center axis of coaxial blowing nozzle 5. The orifice 7a can be 0.10 to 1.5 times, preferably 0.20 to 1.1 times and more preferably 0.25 to 0.8 times the inner diameter of orifice 6a of inner nozzle 6.

The thickness of the molten glass liquid film 9 can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the molten glass 2 through annular space 8 the molten glass 2 can be squeezed or extruded through the very fine gap to form a relatively thin molten glass liquid film 9.

The proper gap can best be determined by pressing the inner coaxial nozzle 6 downward with sufficient pressure to completely block-off the flow of glass, and to then very slowly raise the inner coaxial nozzle 6 until a stable system is obtained, i.e. until the hollow elongated glass cylinder and the microfilaments are being formed.

The tapered nozzle construction illustrated in FIG. 3 can be used to blow glass compositions at relatively high viscosities as well as to blow glass compositions at the relatively low viscosities referred to with regard to FIG. 2 of the drawings. The FIG. 3 embodiment of the invention is of particular advantage in blowing relatively long small diameter microfilaments for use in or as insulating materials.

Referring to FIGS. 4A, 4B and 4C of the drawings there is shown disposed in annular space 8 on the outer surface of inner nozzle 6 thickened or enlarged portion 20 means for providing the thinned wall or weakened portion of the elongated hollow tube or cylinder. The length, diameter and height of the thickened or enlarged portion 20 are such that they cause the flow of molten glass as it passes over and around the thickened or enlarged portion 20 to become thinned and weakened. The thinned and weakened portion of the molten glass is carried downwardly and outwardly to form the elongated hollow tube or cylinder 12, which as a result of the thinned and weakened portion breaks up into a multiplicity of relatively long microfilaments 17.

DESCRIPTION OF THE MICROFILAMENTS

The microfilaments made in accordance with the present invention can be made from a wide variety of inorganic film forming materials and compositions, particularly glass compositions.

The glass microfilaments made in accordance with the present invention preferably have a small size distribution of diameter and length. The microfilaments are of relatively long length and are of relatively uniform diameter.

The glass microfilaments can be made in various lengths and diameters, depending upon the desired end use of the microfilaments. The microspheres can have a length one half to twelve inches, preferably one to eight inches and more preferably two to six inches. The microfilaments can have a diameter of 0.5 to 40 microns, preferably 1.0 to 30 microns and more preferably 2 to 10 microns.

It is found that for a given set of operating conditions that the microfilaments that are obtained have a relatively uniform, narrow diameter size and length size distribution.

The length, diameter and packing of the microfilaments will of course affect the average bulk density of the fiber glass insulating material made from the microfilaments. The insulation material prepared in accordance with the invention will have an average bulk density of 0.3 to 15 lb/ft$^3$, preferably 0.5 to 10 lb/ft$^3$ and more preferably 0.75 to 5 lb/ft$^3$.

EXAMPLES

EXAMPLE 1

A glass composition is used to make glass microfilaments. The glass composition is heated to a temperature of 2650° to 2750° F. to form a fluid molten glass having a viscosity of 35 to 60 poises.

The molten glass is fed to the apparatus of FIGS. 1 and 2 of the drawings. The molten glass passes through annular space 8 of about 0.005 inch, of blowing nozzle 5 and forms thick molten glass film across the orifices 6a and 7a. An inert blowing gas consisting of nitrogen at a temperature of 2650° F. and at a positive pressure is applied to the inner surface of the molten glass film causing the film to distend downwardly into an elongated cylinder shape with its inner end attached to the outer edge of orifice 7a.

The transverse jet is used to direct an inert entraining fluid which consists of nitrogen at a temperature of 2400° F. at a linear velocity of 20 to 80 feet per second over and around the blowing nozzle 5 which entraining fluid assists in the formation of the elongated cylinder and of a multiplicity of microfilaments and detaching of the microfilaments from the elongated cylinder and causing the microfilaments to be entrained in the fluid and carried away from the blowing nozzle. The transverse jet is aligned at an angle of 35° to 50° relative to the blowing nozzle.

The entrained microfilaments are rapidly cooled to about ambient temperature in air at a temperature of 90° to 150° F.

Glass microfilaments having a diameter of 2 to 6 microns diameter and a one to five inch length are obtained.

EXAMPLE 2

A glass composition is used to make glass microfilaments.

The glass composition is heated to a temperature of 2400° to 2550° F. to form a fluid molten glass having a viscosity of 50 to 100 poises.

The molten glass is fed to the apparatus of FIGS. 1 and 3 of the drawings. The molten glass is passed through annular space 8 of blowing nozzle 5 and into tapered portion 21 of outer nozzle 7. The molten glass under pressure is squeezed through a fine gap formed between the outer edge of orifice 6a and the inner surface 22 of the tapered portion 21 of outer nozzle 7. An inert blowing gas at a temperature of 2500° F. and at a positive pressure is applied to the inner surface of the molten glass film causing the film to distend outwardly into an elongated cylinder shape with its inner end attached to the outer edge of orifice 7a.

The transverse jet is used to direct an entraining fluid which consists of nitrogen at a temperature of 2200° F. at a linear velocity of 20 to 80 feet per second over and around the blowing nozzle 5 which entraining fluid assists in the formation of the elongated cylinder and of a multiplicity of microfilaments and detaching of the microfilaments from the elongated cylinder and causing microfilaments to be entrained in the fluid and carried away from the blowing nozzle.

The entrained microfilaments are rapidly cooled in air at a temperature of 90° to 150° F.

Glass microfilaments having a 1 to 5 micron diameter and having a length of 2 to 10 inches are obtained.

UTILITY

The glass microfilaments of the present invention have many uses including the manufacture of superior insulating materials and the use of the microfilaments as a filler or reinforcing filler in cement, plaster and asphalt and synthetic construction board materials.

The microfilaments can be produced from inorganic film forming materials and compositions, from glass compositions and from high melting temperature glass compositions, and when used as a component in building construction retard the development and expansion of fires. The microfilaments and glass microfilaments depending on the composition from which made are stable to many chemical agents and weathering conditions.

The microfilaments can be bonded together by sintering or fusion and molded into low density sheets or other forms and used in new constructions which require thermal insulation including homes, factories and office buildings.

The microfilaments can be spun into fibers and woven into high temperature resistant fabrics. The microfilaments, because they are relatively long, do not require organic adhesive binders and do not produce toxic fumes when exposed to high temperatures or fire.

The microspheres can advantageously be used in plastic or resin boat construction to produce high strength hulls.

The process and apparatus of the prevent invention as mentioned above can be used to blow microfilaments from suitable inorganic film forming materials or compositions having sufficient viscosity at the temperature at which the microfilaments are blown to form a stable elongated hollow cylinder of the material being blown and a multiplicity of microfilaments which microfilaments are subsequently detached and on cooling form hardened microfilaments.

In carrying out the process of the present invention, the material to be used to form the microfilaments can be treated and/or mixed with other materials to adjust the material viscosity and surface tension characteristics such that at the desired blowing temperatures the material is capable of forming microfilaments of the desired diameter and length.

The process and apparatus of the invention can be adapted to be used to form microfilaments from plastics, from metals such as iron, steel, nickel, gold, copper, zinc, tin, brass, lead, aluminum and magnesium and from metal glasses. Suitable plastic materials that can be used are disclosed in applicant's copending application Ser. No. 160,867, filed June 19, 1980 and suitable metals that can be used are disclosed in applicant's copending application Ser. No. 245,137, filed Mar. 18, 1981, both of which applications are encorporated herein by reference.

These and other uses of the present invention will become apparent to those skilled in the art from the foregoing description and the following appended claims.

It will be understood that various changes and modifications may be made in the invention, and that the scope thereof is not to be limited except as set forth in the claims.

What is claimed:

1. A method for making microfilaments from an inorganic film forming material which comprises heating said material, forming a liquid film of said material across an orifice, applying a blowing gas at a positive pressure on the inner surface of the liquid film to blow the film and form an elongated hollow tube or cylinder, forming a thinned wall or weakened portion of the elongated hollow cylinder, subjecting the elongated hollow tube or cylinder during its formation to an external pulsating or fluctuating pressure field having periodic oscillations, said pulsating or fluctuating pressure field acting on said elongated hollow tube or cylinder to assist in its formation and to assist in the formation of a multiplicity of microfilaments and in detaching the microfilaments from said orifice.

2. The method of claim 1 wherein the liquid film of film forming material is formed across the orifice of a coaxial blowing nozzle, said blowing nozzle having an inner nozzle to convey said blowing gas to the inner surface of the liquid film and an outer nozzle to convey said material to said orifice and means disposed near said orifice form the thinned wall or weakened portion of said elongated hollow tube or cylinder, and pulsating or fluctuating pressure inducing means is directed at an angle to said coaxial blowing nozzle to induce said pulsating or fluctuating pressure field at the opposite or lee side of said coaxial blowing nozzle in the wake or shadow of said coaxial blowing nozzle.

3. The method of claim 1 wherein an entraining fluid is directed at an angle to a coaxial blowing nozzle having an orifice, an inner nozzle and an outer nozzle, the liquid film of film forming material is formed across the orifice, the blowing gas is conveyed to the inner surface of the liquid film through said inner nozzle, the film forming material is conveyed through said outer nozzle to said orifice, and means disposed near said orifice between the inner and outer nozzle form a thinned wall or weakened portion of said elongated hollow tube or cylinder and the entraining fluid passes over and around said coaxial nozzle to fluid dynamically induce the pulsating or fluctuating pressure field at the opposite or lee side of the blowing nozzle in the wake or shadow of the coaxial blowing nozzle.

4. The method of claim 3 wherein the lower portion of the outer nozzle is tapered inwardly to form with the outer edge of the inner nozzle a fine gap and the film forming material is fed under pressure and extruded through said gap to form a thin film of film forming material across the orifice of the blowing nozzle.

5. A method for making hollow glass microfilaments which comprises heating glass to form molten glass, forming a liquid film of molten glass across an orifice, applying a blowing gas at a positive pressure on the inner surface of the liquid film to blow the film and form an elongated hollow tube or cylinder, forming a thinned wall or weakened portion of the elongated hollow tube or cylinder, subjecting the elongated hollow tube or cylinder during its formation to a pulsating or fluctuating pressure field having periodic oscillations, said pulsating or fluctuating pressure field acting on said elongated hollow tube or cylinder to assist in its formation and to assist in the formation of a multiplicity of microfilaments and in detaching the microfilaments from said orifice.

6. The method of claim 5 wherein said liquid film of molten glass is formed across the orifice of a coaxial blowing nozzle, said blowing nozzle having an inner nozzle to convey said blowing gas to the inner surface of the liquid film, and an outer nozzle to convey said molten glass to said orifice and means disposed near said orifice between the inner and outer nozzle form a thinned wall or weakened portion of said elongated hollow tube or cylinder, and pulsating or fluctuating pressure inducing means is directed at an angle to said coaxial blowing nozzle to induce said pulsating or fluctuating pressure field at the opposite or lee side of said coaxial blowing nozzle in the wake or shadow of said coaxial blowing nozzle.

7. The method of claim 6 wherein the molten glass has a viscosity of 10 to 400 poises.

8. The method of claim 6 wherein the molten glass has a viscosity of 20 to 250 poises.

9. The method of claim 6 wherein the molten glass has a viscosity of 30 to 150 poises.

10. The method of claim 6 wherein said entraining fluid has a linear velocity in the region of the elongated hollow tube or cylinder formation of 5 to 120 ft/sec and entrains and transports the microfilaments away from the blowing nozzle.

11. The method of claim 10 wherein said entraining fluid has a linear velocity in the region of elongated hollow tube or cylinder formation of 10 to 80 ft/sec.

12. The method of claim 10 wherein said entraining fluid has a linear velocity in the region of elongated hollow tube or cylinder formation of 20 to 60 ft/sec.

13. A method for making glass microfilaments which comprises heating glass to form molten glass, forming a liquid film of molten glass across an orifice of a coaxial blowing nozzle, said blowing nozzle having an inner nozzle to convey a blowing gas to the inner surface of the liquid film and an outer nozzle to convey said molten glass to said orifice, applying said blowing gas through said inner nozzle at positive pressure on the inner surface of the liquid film to blow the film downwardly and outwardly to form an elongated hollow tube or cylinder, means disposed near said orifice between the inner and outer nozzle form a thinned wall or weakened portion of said elongated hollow tube or cylinder, continuously feeding said molten glass to said outer nozzle while said elongated hollow tube or cylinder is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the elongated hollow tube or cylinder to break up said tube or cylinder into a multiplicity of microfilaments which are connected to said tube or cylinder at a point proximate to the coaxial blowing nozzle and said entraining fluid acting to detach the microfilaments from the coaxial blowing nozzle and cooling and solidifying said microfilaments.

14. The method of claim 13 wherein the lower portion of the outer nozzle is tapered inwardly to form with the outer edge of the orifice of the inner nozzle a fine gap and feeding the molten glass under pressure through said gap to form a thin film of molten glass across the orifice of the blowing nozzle.

15. The method of claim 13 wherein the glass microfilaments are one to 8 inches in length and have a diameter of 1.0 to 30 microns.

16. A method of making glass microfilaments which comprises heating glass to form molten glass, forming a liquid film of molten glass across an orifice of a coaxial blowing nozzle, said blowing nozzle having an inner nozzle to convey a blowing gas to the inner surface of the liquid film and an outer nozzle to convey molten glass to said orifice, the lower portion of said outer nozzle being tapered inwardly to form with the outer edge of the inner nozzle a fine gap, feeding the molten glass under the pressure through said gap and forming said thin film of molten glass across said orifice of the blowing nozzle, applying said blowing gas through said inner nozzle at positive pressure on the inner surface of the liquid film to blow the film downwardly and outwardly to form an elongated hollow tube or cylinder, means disposed near said orifice between the inner and outer nozzle form a thinned wall or weakened portion of an elongated hollow tube or cylinder, continuously feeding said molten glass to said outer nozzle while said elongated hollow tube or cylinder is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the elongated hollow tube or cylinder to break up said tube or cylinder into a multiplicity of microfilaments which are connected to said tube or cylinder at a point proximate to the coaxial blowing nozzle and said entraining fluid acting to detach the microfilaments from the coaxial blowing nozzle, and cooling, solidifying and hardening said microfilaments to obtain microfilaments of 2 to 6 inches in length and 2.0 to 10 microns in diameter.

17. An apparatus for blowing glass microfilaments comprising means for holding molten glass, a coaxial blowing nozzle comprising an inner nozzle having an inner orifice at the lower end thereof for a blowing gas and an outer nozzle having an outer orifice for the molten glass, and means for feeding said molten glass to said coaxial nozzle, said inner nozzle orifice being disposed proximate to said outer orifice, and means disposed near said inner nozzle orifice between the inner and outer nozzle for forming a thinned wall or weakened portion of an elongated hollow tube or cylinder, there being disposed external to said blowing nozzle a transverse jet cooperatiang with said blowing nozzle by which an entraining fluid is directed at said coaxial blowing nozzle at an angle relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

18. The apparatus of claim 17 wherein the lower portion of the outer nozzle is tapered inwardly to form with the outer edge of the orifice of the inner nozzle a fine gap.

* * * * *